Oct. 28, 1958 — W. F. PHILLIPS — 2,858,022
SEED CLEANER
Filed July 2, 1954 — 5 Sheets-Sheet 1

Fig. 1

William F. Phillips
INVENTOR.

BY *James F. Weiler*

ATTORNEY

United States Patent Office 2,858,022
Patented Oct. 28, 1958

2,858,022

SEED CLEANER

William F. Phillips, Houston, Tex., assignor to Anderson, Clayton & Co., Houston, Tex., a corporation of Delaware Application July 2, 1954, Serial No. 440,992

17 Claims. (Cl. 209—289)

The present invention relates to a seed cleaner and methods of cleaning seed and, more particularly, relates to a seed cleaner particularly adapted for and methods of cleaning cotton seed and the like.

While the present invention may be adapted for a wide variety of uses, it is particularly advantageous for use in the cleaning of cotton seed and the following description of an example of the invention, given for the purpose of disclosure, is adapted for that use although other uses will readily suggest themselves to those skilled in the art.

Cotton seed is presently being cleaned by so-called shakers, sand and boll reels and by air separators. In general, this equipment is not doing the job that is expected or desired and there has been a general recognition in the art that apparatus for and methods of seed cleaning need drastic changes or a complete change in approach to the question of seed cleaning.

It is important the seed be cleaned before it is passed to the linters, which remove the linters from the seed so that cleaner seed and lint may be provided for industry. Mechanical harvesting of cotton is becoming more widespread and, as a consequence, the cotton seed is becoming more contaminated with trash, yet it has become increasingly important and necessary to produce a cleaner seed and lint, such as for the chemical industry.

The present invention is based upon the principle that any elongated or cylindrical object when borne in a stream of moving air and moved generally vertically and upwardly by said stream will align itself with its longitudinal axis at right angles to the direction of air flow. Similarly, a flat or approximately flat object when borne by a stream of air and moved generally vertically upwardly will so align itself that its major axis parallel to the flat surface is at right angles to the direction of air flow. The present invention utilizes this principle in that the trash is filtered from the seed by having the stream including the seed and trash strike or impinge a filter which has openings of a size sufficient to permit the passage of the seed but small enough to prevent the passage of the rather coarse trash or coarse tails in order that the longitudinal or major axis of the trash will not pass through the filter and thus is separated from the seed, the trash being discharged to waste. One or more of such filters may be utilized and, preferably, these may take the form of screens which comprise the surface of reels which are rotated so that the trash may be discharged to waste.

The present invention also includes removal of the fine tails or trash in that after the coarse tails or trash have been removed from the seed, the seed, along with the fine tails or trash, may be made to impinge a filter or screen which has openings of a size to prevent the passage of the seed therethrough, yet will permit the fine tails or trash to pass therethrough thereby further separating the trash from the seeds. The seeds are then discharged to be passed on to the linters in the usual manner and, preferably, again the filter or screen is in the form of a rotating reel to aid in conveying the seed to the desired location.

In order to successfully utilize the principles of the present invention it sometimes is necessary to completely aerate and break the seed lumps. This is accomplished by the present invention due to the feeder arrangement and air blasts. Heretofore, it has been considered impractical to pass seed through a small mesh or filter because of its tendency to cling together.

Cotton seed is somewhat different from other seed or grains in that it is covered by a fuzzy covering of lint which is left on the seed by the gins. This lint causes the seed to stick or adhere together; thus, cotton seed is not as free flowing as ordinary grains. Since the seeds tend to stick together, it is difficult to screen them although each individual seed may be about one-fourth inch to about three-eighth inch long because their tendency to adhere together enables them to pass over perforated metal plates having holes as large as five-eighths inch in diameter by clinging together and bridging over the perforations.

It is for this reason that many of the present cotton seed cleaning machines use shaker trays clothed with perforated metal to clean seeds, the theory being to sift the seeds through the small holes and allow the larger trash to remain on the tray and finally "tail over" the lower end of the sloping tray. In this type of a shaker, for any given rate of seed flow, the smaller the perforations, the greater will be the amount of seed "tailing over" with the trash. In order to obtain better cleaning efficiency, shaker trays are clothed with small perforated metal. This reduces the capacity drastically since the flow rate must be lower to prevent too many seeds from tailing over with the trash. If the perforations in the tray are made larger to prevent seed from tailing over, then cleaning efficiency is greatly lowered by trash dropping through the large perforations along with the seed. These inherent characteristics of the shaker type of cleaner make it necessary to restrict the rate of flow to approximately one ton of seed per twenty-four hours per square foot of shaker area when the shaker is clothed with half-inch diameter perforated metal. Inasmuch as the seed is induced to fall through the screen by agitation and by gravity, the result is a comparatively slow movement of the seed down the tray and through the screen. Also, in the shaker type cleaner, trash has an opportunity to fall through the perforations every time the shaker moves.

It is therefore an important object of the present invention to provide a seed cleaner and a method of cleaning seed which is much more efficient and provides a much cleaner seed and removes more trash than other seed cleaners and methods now known to the art.

A further object of the present invention is to provide a seed cleaner and a method of cleaning seed of greatly increased efficiency over those presently known to the art, which is faster than those of the prior art thereby permitting more tonnage to be cleaned a day, and which greatly minimizes tailing over or recycling seeds to acquire a particular cleaning efficiency.

It is yet a further object of the present invention to provide a seed cleaner of the above character which is more compact than those of the prior art.

It is yet a further object of the present invention to provide a seed cleaner which has a greatly increased rate of seed flow and yet at the same time greater cleaner efficiency is obtained than with conventional shaker type seed cleaners.

Yet a further object of the present invention is the provision of a seed cleaner in which the seeds are finely dispersed in the air stream by a feeder assembly which generally throws the seed into the air stream in a very thin sheet thereby separating the seed and preventing the seed from clinging together.

Yet a further object of the present invention is the provision of a seed cleaner in which the trash does not move relative to the screen and has no opportunity for a "second chance" to pass through the perforations or openings in the stream.

In present seed cleaners considerable dust and lint are discharged in the room where the machines are stationed thereby providing very dusty and dirty working conditions which necessitate frequent cleanings and the operators wearing dust masks. Accordingly, it is yet a further object of the present invention to provide a seed cleaner and a method of cleaning seed of increased efficiency which operates wholly under vacuum thereby reducing dust and lint which is discharged in the room and thereby avoiding the dirty conditions of the prior cleaners and methods and avoiding the wearing of dust masks by operators.

Other and further objects, advantages and features will appear as a description of an example of the invention proceeds, taken in conjunction with the accompanying drawings, in which like character references designate like parts throughout the several views, and where.

Figure 1:
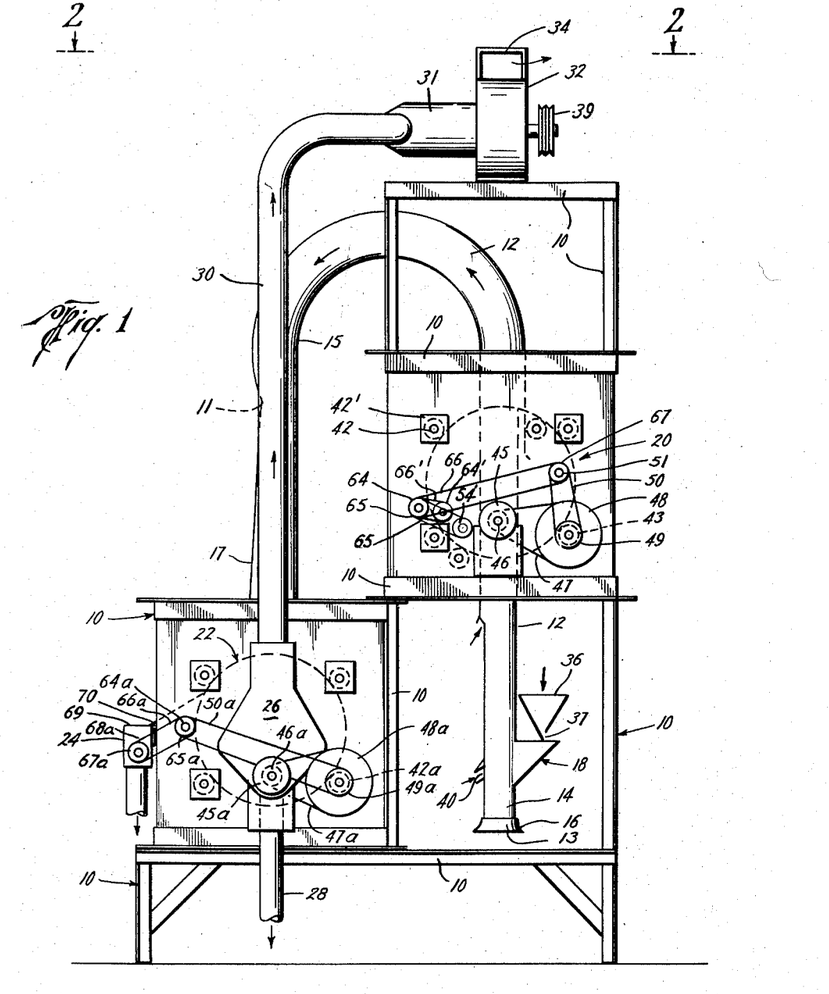
Figure 1 is a side elevation of a seed cleaner constructed according to the invention and which may be used in the process according to the invention.

Referring now to the drawings, and particularly to Figure 1, a suitable frame structure generally designated by the reference numeral 10 is illustrated to support the various parts of the machine. Inasmuch as the framing as such forms no part of the invention and may assume many and widely varied forms, no detailed description thereof is deemed necessary, it being deemed sufficient to point out that suitable framing structure is utilized to support the various elements of the seed cleaner.

Figure 5:
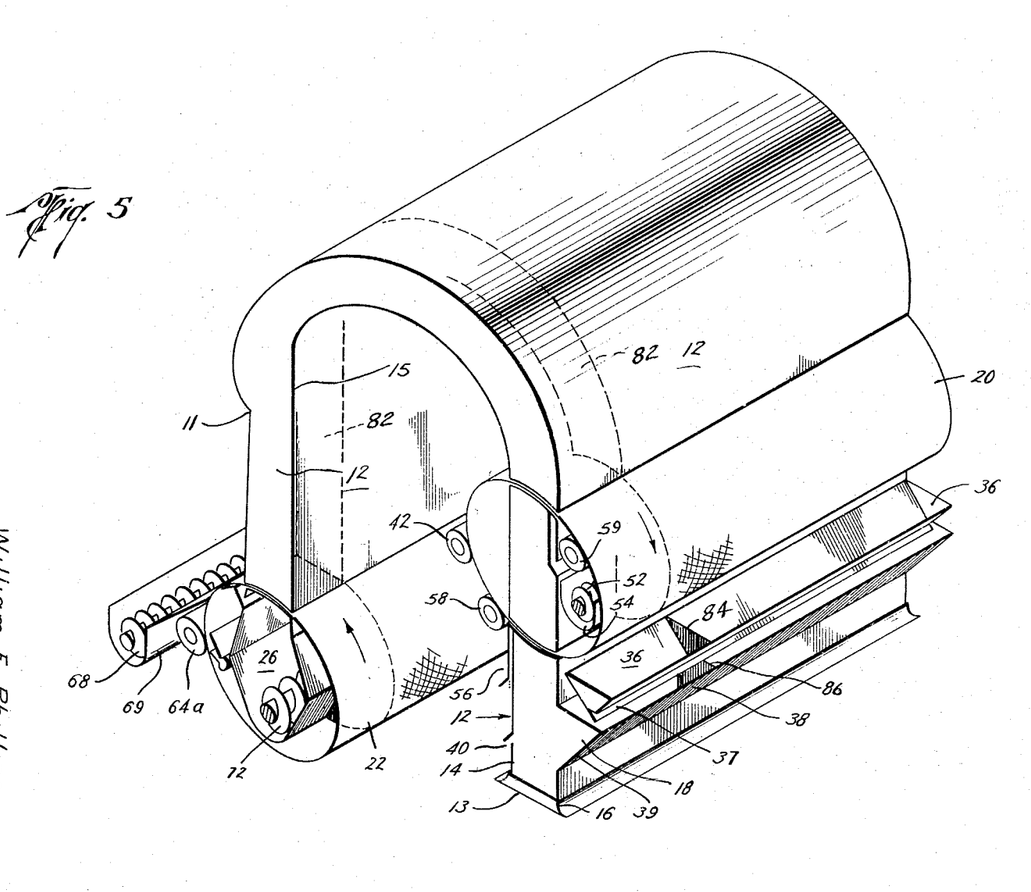
Figure 5 is a partially diagrammatic perspective view of a modified seed cleaner constructed according to the invention.

The seed cleaner comprises a generally inverted and elongated U-shaped housing or air chamber 12, which may be generally rectangular in cross-section, as best seen in Figure 5. The housing 12 may be formed of any suitable material, such as sheet metal and the like, and, preferably, should have fairly smooth inner walls to permit free flow of air therethrough. The lower end of the generally upright leg 14 of the housing is provided with an air inlet 13 and it is flared as at 16 to facilitate entrance of air into the inlet 13 of the upright leg 14 of the housing 12. A feeder, generally indicated by the numeral 18, is provided which feeds the seed in a relatively fine sheet downwardly into the upwardly-flowing air which is sucked through the housing 12 in a manner described later.

One or more filters, generally indicated by the reference numerals 20 and 22 are disposed in the housing 12 and in the path of the flow of air therethrough. In the arrangement illustrated, the filter 20 removes the coarse tailings or trash from the seed, the seed passing therethrough, and the filter 22 disposed in the generally downwardly-extending leg 15 removes the fine tailings or trash, the seed not passing therethrough, but the fine tailings passing through this filter.

It will be understood that the present invention includes a single filter arrangement to filter out the coarse trash, although several may be utilized for this purpose, and any type of conventional cleaner may be utilized in separating the fine tailings from the seed.

Figure 2:
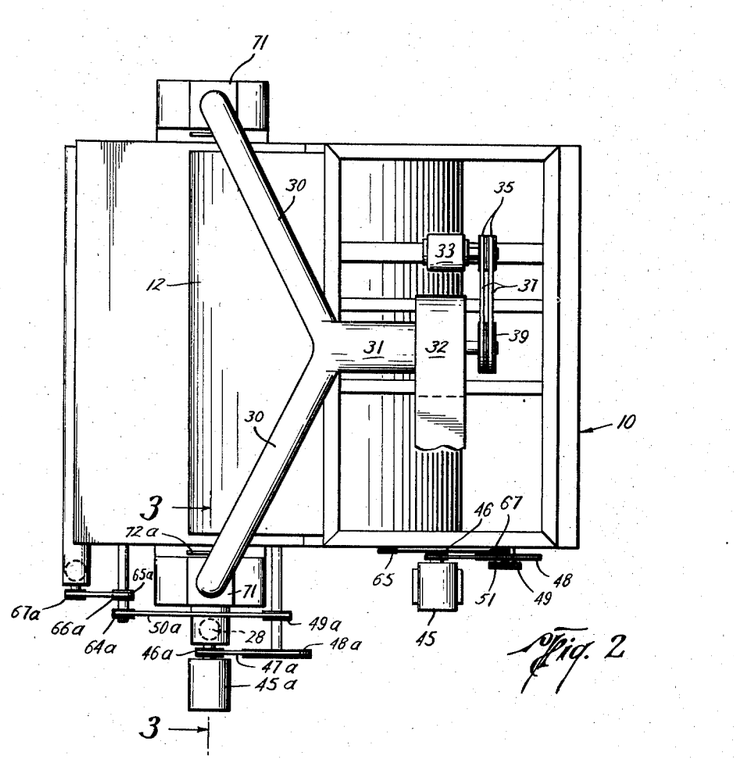
Figure 2 is a plan view taken along the line 2—2 of Figure 1.

The clean seed is conveyed by the conveyer 24 to the desired location and the fine tailings are dropped out of the drop out box 26, which is of enlarged cross-section and out the downwardly extending outlet 28, the air stream continuing to be drawn through the ducts 30 and 31 extending to a suction fan 32, as best seen in Figure 2. Thus, the fan 32 sucks in air through the opening 13 at the lower end of the upright leg 14 of the housing 12 and the air is drawn through the filter 20, through the downwardly extending leg 15 and through the filter 22, the drop out box 26, through the conduits 30 and 31, and is finally discharged through the outlet 34 of the vacuum type fan 32.

As best seen in Figure 2, a prime mover 33 is provided which drives the driving pulleys 35, and by means of the endless belts 37 disposed about the driving pulleys 35 and driven pulleys 39, the vacuum fan is rotated. These various elements are all suitably connected and supported by the frame 10, and no more description thereof is deemed necessary.

Figure 4A:
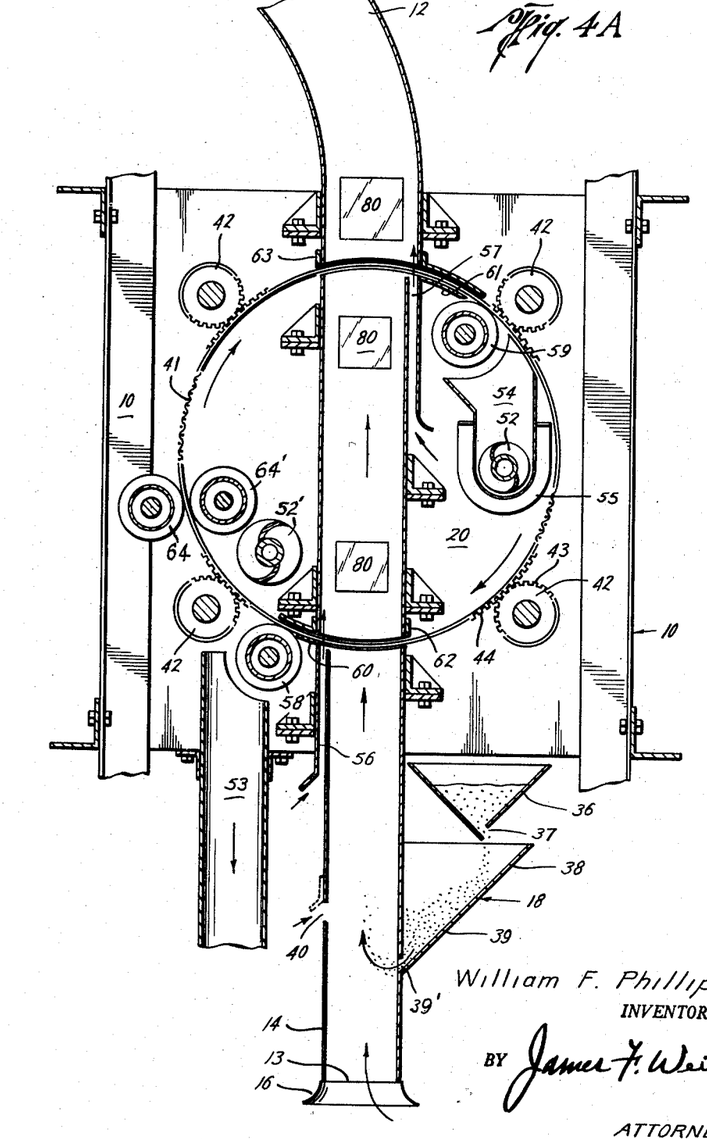

Referring now to Figure 4-A, the feed assembly 18 may include the gravity feed hopper 36 which feeds the cotton seed by gravity through the opening 37 in the lower end thereof to the inlet 38 having the downwardly and inwardly extending wall 39 to the slot 39' in the upright leg 14 whereby a relatively thin sheet of cotton seed is fed into the housing 12 where it is met by the air current moving upwardly therein which effectively separates the linty cotton seed from one another. As mentioned previously, in order for the cotton seed to effectively pass through the filter it is necessary that the cotton seed be separated so that they do not cling together and bridge over the perforations thereby preventing their passage through the filter.

An opening or auxiliary air jet 40 is provided in the conduit 12 and is disposed generally opposite the feed inlet 38 to aid in positioning the seeds in the air duct by blowing them over toward the feeder side of the duct. Also, the greater amount of air drawn along with the seed, the less seed will fail to go through the filter screen. However, if too much air is drawn through the inlet 13, black seed or heavy trash, such as pebbles and dirt clods, cannot be moted out the inlet 13. The auxiliary air jet 40 permits of the required amount of inflow of air to assist the maximum amount of seed to pass the filter 20 yet permits black seed and/or trash to fall out the inlet 13.

Still with reference to Figure 4-A, the filter 20 may preferably take the form of a cylinder which has open ends and a screen disposed about the ends to form the cylindrical sides. While any type of screen may be utilized, a satisfactory screen for filtering cotton seed from the South Plains area of Texas is a two and one-half inch mesh screen, the wire having a diameter of .054 inch, which has approximately three-eighths inch square openings therethrough. Obviously, the screen size will vary with the type of seed being cleaned or the particular materials being separated.

The filter 20 is rotatably disposed through the generally upright leg 14 of the housing 12 and is supported by the rollers 42 journaled to the frame 10 in any suitable manner, such as by the brackets 42', see Figure 1; the rollers 42 having the gears 43 which mesh with the gear rack 44 formed about each end, only one end being shown, of the cylindrical filter 20. A prime mover 45, see Figures 1 and 2, is utilized to drive the gear 43 by means of a belt and pulley arrangement which includes the driving pulley 46, endless pulley belt 47, and driven pulley 48 to which is connected the gear 43. As will be apparent later an additional pulley wheel 49 is provided which drives the endless pulley belt 50 thereby driving the driven pulley wheel 51 which is connected to the screw conveyer 52 disposed within the screen for a purpose apparent later. Obviously, any suitable drive arrangement may be utilized and no more detailed description thereof is deemed necessary.

Thus, the air drawn through the inlet 13 in the upright leg 14 of the housing 12 picks up the generally horizontally-injected, relatively thin stream or sheet of cotton seed from the feed inlet 18, which cotton seed has both fine and coarse trash. The major or long axes of the trash strike the rotating screen at its lowermost portion and adhere thereto, with the cotton seed passing through the lower portion where it is filtered and passes through the upper portion where it is again filtered and, subsequently, passes upwardly into the inverted U-shaped neck of the housing 12. Thus, whatever coarse trash which may pass through the lower portion of the rotating cylindrical filter 20 is further separated by means of impinging the underside of the upper portion of the filter 20.

Referring again to Figure 4–A, for the purpose of discharging the trash to waste a gravity discharge 53 is disposed exteriorly of the leg 14 of the housing 12 and generally below and on the side of the housing in the direction of travel of the filter. As mentioned previously, a screw conveyer 52 is provided inside the filter 20, but exteriorly of the leg 14 of the housing 12 to discharge the filtered trash within the filter to waste. Thus, trash adhering to the underside of the filter 12 at its bottom and at its top is moved by the rotation of the filter into the conveyers 53 and 52, respectively, and removed to waste. If desired, an additional screw conveyer 52' may be provided interiorly of the filter 20 for discharging trash interiorly thereof which is driven by the belt 68, see Figure 1. A hopper is utilized in connection with the trash conveyer 52' similar to that used with the conveyer 52, but this detail has been omitted for clarity in the drawings. For convenience, the screw conveyer 52 is provided in the lowermost portion of a hopper 54 which is secured to the frame members 10, by the bracket 55.

In order to prevent filtered seed from being carried out of the generally upright leg 14 of the housing 12 by means of the rotation of the filter 20, auxiliary air blasts are provided by means of the auxiliary conduits 56 and 57 which extend upwardly and open into the leg 14 of the housing 12 closely adjacent the underside of the filter 20 at its bottom and top, respectively, and on the side in the direction of travel of the filter. Thus, air being drawn into the leg 14 of the housing 12 causes the seed to move upwardly through the filter and remain therein, yet, at the same time, permits the trash which has been drawn up against the screen 20 to be moved by the screen to waste.

In order to prevent the sticks and trash from being upended and, hence, sucked through the screen as they pass out of the air chamber or leg 14 of the housing 12, the sealing rolls 58 and 59 are provided which are rotatably disposed closely adjacent to the arcuately extending lips 60 and 61, viewed in cross-section, secured to the duct members 56 and 57, respectively. The rollers 58 and 59, preferably, have a resilient material thereon which sealingly engages the screen 41, such as rubber, neoprene, and the like. In addition, if desired, a seal may be placed on the opposite side of the leg or air chamber 14 from the rollers 58 and 59 adjacent the under portions of the screen 20 on the sides of the leg 14 away from the direction of travel of the screen 20, such as at 62 and 63, and this may take the form of a strip of sealing material, such as canvas, neoprene and the like.

If desired, one or more brushes 64 and 64' may be provided which brush the screen 20 and are driven by means of the driven pulley 65 by the belts 66 and 66' which are disposed about the pulley 67 and from the brush 64, respectively. These brushes may be located inside and/or outside of the filter 20, as desired. Thus, the filter 20 is self-cleaning by means of the brush 64 in its operation although this brush may be omitted, if desired.

It should be noted that the brushes 64 and 64' may be provided as desired, or omitted. Also, that the trash conveyers may be arranged as desired for the particular material being separated, the rate of flow and the like. For example, note Figure 5 where the inside brush 64' and conveyer 52' are omitted.

Figure 4B:
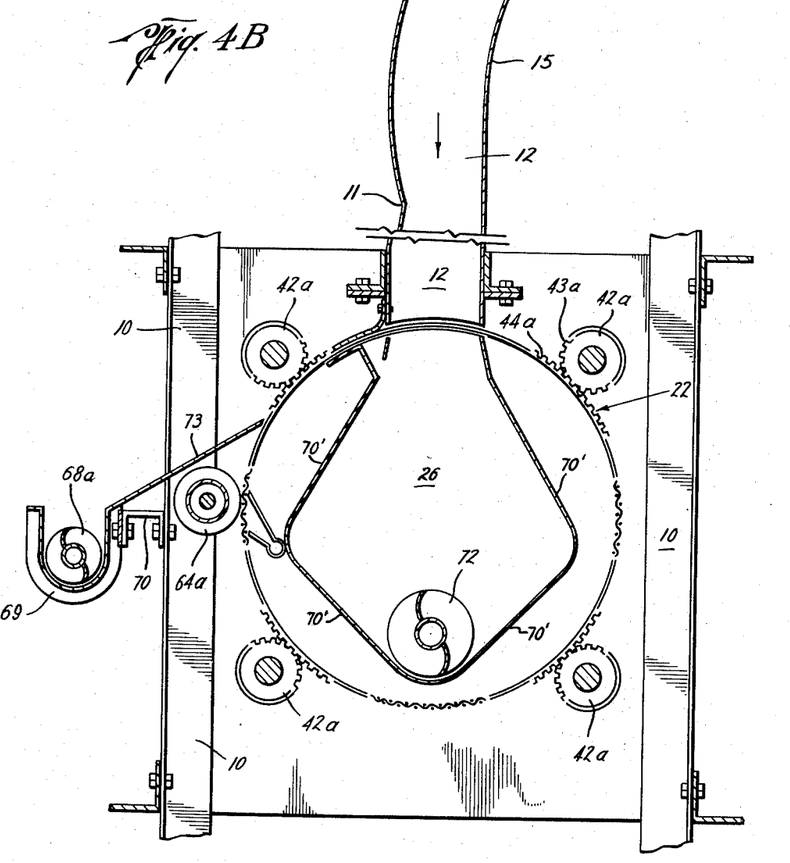

For convenience and as mentioned previously, the housing 12 is generally of inverted U-shaped configuration, although it may take any desired shape and may be utilized in connection with any type of filter for filtering out the fines. The arrangement illustrated is advantageous, however, and, as best seen in Figure 4–B at the lower end of the downwardly-extending leg 15 of the housing 12 there is the filter 22, which is in all respects the same as the filter 20, except that a finer mesh screen is provided through which seed will not pass, but the fine tailings will pass. For example, wedge wire cloth is satisfactory for this purpose. It should be noted, that in the event some coarse tailings should pass through the filter 20, the leg 15 is restricted at 11 and is outwardly and downwardly tapered, as at 17, to provide means for disturbing the flow of air so that the trash is upended and the longitudinal or major axes of the material will not necessarily be at right angles to the filter 22 and, accordingly, much of this material will pass through the filter 22. Of course, any suitable means for providing eddy currents may be used for this purpose.

Thus, the filter 22 is rotatably journaled in the frame 10 by means of the rollers 42a, gears 43a, gear rack 44a and is driven by the prime mover 45a, as shown in Figure 1. The prime mover 45a has the pulley wheel 46a thereon which drives the endless pulley belt 47a which is disposed about the driven pulley belt 48a, to which the roller 42a is connected. An additional pulley wheel 49a is rotated by the pulley wheel 48a to which is secured the endless pulley belt 50a which drives the brush 64a, for cleaning the screen or filter 22. An additional pulley wheel 65a is provided which drives the endless pulley belt 66a disposed about the driven pulley 67a which drives the clean seed conveyer 68a journaled in the conveyer housing 69, the latter being connected to the frame 10 by means of the bracket 70.

Thus, the various elements of the filter 22 are driven by means of the prime mover 45a in substantially the same manner as the elements of filter 20 are driven. As mentioned previously, roller 64a comprises in effect a brush to brush seed and lint from the screen so that it will be self-cleaning in operation, although this brush may be omitted if desired. Also, more than one brush may be used, which may be located on the inside of the filter 22, if desired.

Figure 3:
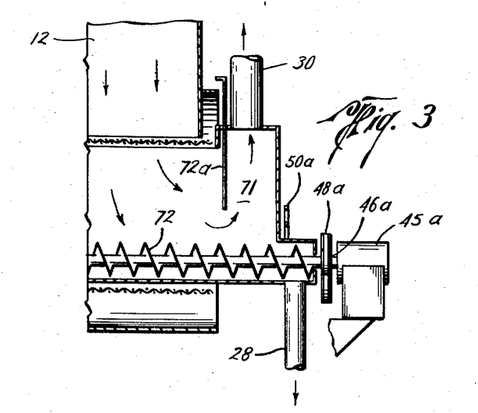
Figure 3 is a cross-sectional view taken along the line 3—3 of Figure 2 and illustrates a drop out separator system for removing the fine trash from the air drawn through the cleaner, Figure 4-A is a fragmentary sectional view, in elevation, illustrating the inlet for the seed and the seed cleaner illustrated in Figure 1, Figure 4-B is a view similar to that of Figure 4-A and represents a continuation thereof and illustrates, in elevational section, mechanism for cleaning fine tails from the clean seed.

Referring again to Figure 4–B there is disposed interiorly of the cylindrical screen or filter 22 what is in effect a drop out box 26, which has the extended side walls 70', when viewed in cross-section, to provide a reduction in velocity, the air being drawn off at the ends, see Figures 2 and 3, through the upwardly extending conduits 71 connected to the conduits 30, the former being baffled by the baffle plates 72a to assure a sudden change in direction of the air current in combination with the drop in velocity due to the enlarged drop out box 26. Thus, the fine tails are dropped out in the drop out box 26, and substantially clean air is drawn through the upwardly-extending openings 71, the conduits 30 and 31 and out the opening 34 in the housing of the vacuum fan 32.

A fine tail screw conveyer 72 is provided in the lowermost portion of the drop out box 26 and an outer end, in the direction of travel of the screw conveyer 72, is provided with the discharge tube 28 which is provided with a vacuum seal, not shown.

Thus, the fines are discharged to waste from the drop out box 26 in the discharge tube 28.

In operation, the various parts are actuated by the various prime movers, and a measured or predetermined amount of cotton seed flows by gravity in the inlet 18 proximate the lower end of the generally upright leg 14 of the housing 12, which seed is separated by the upwardly moving current of air drawn in through the air inlet 13 by means of the suction fan 32. The flared portion 13 facilitates entrance of air into the leg 14 and the auxiliary air jet 40 insures sufficient air for maximum transmission of the seed through the screen yet permits black seed and heavy trash to fall out the inlet 13, as previously explained.

As the cotton seed with trash therein moves upwardly, the major or long axes of the trash align themselves at right angles to the direction of air flow, and, accordingly, the long axes strike the rotating screen or filter 20 and are carried out of the air chamber or leg 14 thereof on the surface of the screen. This trash is collected and discharged to waste in the discharge conveyers 53 and 54. The auxiliary blasts of air drawn in at 56 and 57 provide sufficient additional currents of air to prevent the seed from being moved outwardly with the trash and thereby aids in drawing it through the screen surface. The resilient rollers 58 and 59 prevent the trash from changing their longitudinal axes with respect to the screen as it leaves the air chamber thus assuring that the trash will be discharged to waste. Thus, a double filtering action takes place with respect to the single filter 20.

The filter 20 filters out the coarse tailings and trash, and the cotton seed and fine tailings are drawn upwardly and then downwardly in the leg 15 of the air chamber or housing 12 where they strike the upper surface of the revolving filter cylinder 22. The restricted portion 11 and tapering portion 17 disturb the flow of air setting up eddy currents to upend the trash thereby assisting its passage through the screen 22 in the event any coarse trash has not been removed. The openings of the screen in this filter are too small for the seed to pass therethrough and, thus, the seed are conveyed to the discharge slide 73 to the discharge screw auger 68a. The fines pass through the screen 22 into the drop out box 26 where the velocity is greatly reduced due to the enlarged cross-section and sudden change of direction of the air current, which passes on up the conduits 71 into the conduits 30 and conduit 31 out through the opening 34 in the fan housing 32. The dropped out fines are conveyed by the screw conveyer to the fine discharge outlet 28, as best seen in Figure 3.

It has been found that a seed cleaner constructed according to the present invention has an efficiency of about 80%–85% in cleaning seed in comparison to approximately a 50% or 55% efficiency in the slow velocity type shaker cleaners in use at the present.

If desired, and as a refinement, windows 80 may be spaced along the air chamber or housing 12 so that the operations may readily be viewed.

The seed cleaner illustrated in Figure 5 is in all things the same as that described before except that the housing 12 is divided into separate compartments by the partition 32. Similarly, partitions are provided in the hopper 36, and the feeder 18, as at 84 and 86, respectively. A finer mesh screen is disposed about the filter 20 in one of the partitioned compartments. The large capacity of the apparatus and this construction permits the seed or other material to be fed to the fine screen side where a large portion of seed is rejected with the trash, and then this rejected seed and trash is fed into the other compartment and processed as described previously. This permits reclaiming and feeding the seed back through the apparatus thereby increasing cleaning efficiency. Any number of compartments and different mesh screens may be provided.

It will be understood, of course, that the present invention contemplates a single filtering, that is a single filter, such as generally designated at 20 may be provided, and removing the seeds from the inside of the screen 20 rather than passed through the upper portion so that a single screening takes place. Also, the cotton seed may come from a conventional shaker type cleaner and/or be passed to a conventional type shaker through one or more screenings which has resulted in greater cleaning efficiency. Thus, the present invention may be varied considerably in detail and be utilized in combination with other and conventional type of seed cleaners.

It is thought that the method of the invention is illustrated by the apparatus disclosed. Thus, the method includes injecting the seed in a stream of air, propelling the seed by the stream of air until such time as the longitudinal or major axes of trash injected with the seed align themselves at right angles to the direction of flow of the air, and then propelling or drawing the stream of air through a screen disposed generally at right angles to the direction of flow of the stream of air so that the seed pass through the screen and the trash impinge and are prevented from passing through the screen, the screen having openings of a size to permit passage of the seed but insufficient to permit passage of the trash having longitudinal or major axes greater than the openings although the lateral or minor axes are such to permit passage through the screen. Preferably, the direction of flow of air should be upwardly or gradually vertically. This filtering removes coarse tailings or extraneous objects from the seed.

The method of the invention includes injecting linty seed or seed having a tendency to cling together in a thin sheet generally in a direction opposite to that of the air stream for separating this type of seed to prevent bridging over of the screen.

Also included in the method of the invention is propelling the seed after removal of the coarse tailings or objects through a relatively fine screen, that is, one through which the seed will not pass but through which the fine tailings or extraneous objects will pass. Preferably, eddy currents are set up in the stream of air after leaving the coarse screen to upend coarse tailings or objects which have not been filtered so that they will pass through the fine screen.

Thus, the present invention is well suited to carry out the objects and attain the ends, objects and advantages set forth as well as others inherent therein.

While the description has been directed toward cleaning cotton seed, obviously, other uses will suggest themselves to those skilled in the various arts, such as, for example, peanuts, soy beans and other vegetable oil seeds. Also, uses in other industries will suggest themselves where it is desirable to separate certain types of objects from others.

Thus, while only a single example of the present invention is given for the purpose of disclosure, numerous changes in details and rearrangement of parts can be made which are encompassed within the spirit of the invention and the scope of the appended claims.

What is claimed is:

1. A filtering device comprising a housing having a generally upright portion, an inlet adjacent the lower end of the housing for permitting flow of air into the housing, an outlet adjacent the other end of the housing for permitting air to flow out of the housing, means for drawing air through the inlet, housing and out the outlet, means for injecting material to be filtered into the housing above the inlet, a rotary screen disposed in the upright portion and spaced above said means for injecting material a distance sufficient to permit major axes of extraneous material injected with the material to be filtered to be aligned at approximately right angles to the direction of flow of said air in the housing upon striking the rotary screen, said rotary screen having openings in its sides sufficient to permit passage of the material to be filtered therethrough but insufficient to permit passage therethrough of the longitudinal or major axes of said extraneous material having longitudinal or major axes greater than that of the material to be filtered, said rotary screen extending completely across the housing whereby material to be filtered is drawn through at least one wall of the rotary screen and said extraneous material presents its longitudinal or major axes to the screen and thereby is prevented from being drawn through the screen, rotation of said screen discharging the extraneous material exteriorly of the housing, and means for rotating the screen.

2. A seed cleaner comprising a housing having a generally upright portion, an inlet adjacent the lower end of the housing for permitting flow of air into the housing, an outlet adjacent the other end of the housing for permitting flow of air out of the housing, means for drawing air through the inlet, housing and out the outlet, means for injecting seed into the housing adjacent the lower end and above the inlet, a rotary screen disposed in the upright portion and spaced above said means for injecting seed a distance sufficient to permit major axes of trash injected with the seed to be aligned at approximately right angles to the direction of flow of said air in the housing upon striking the rotary screen, said rotary screen having openings in its sides sufficient to permit passage of the seeds therethrough but insufficient to permit passage therethrough of the longitudinal or major axes of trash having longitudinal or major axes greater than that of the seed, said rotary screen extending completely across the housing and being rotatable about a horizontal axis, said housing extending interiorly of and beyond said rotary screen whereby seed is drawn through the rotary screen and trash presents its longitudinal or major axes to the screen and thereby is filtered from the trash by the screen, rotation of said screen discharging the trash exteriorly of the housing, and means for rotating said rotary screen.

3. The seed cleaner of claim 2 including additional air inlets provided in the housing adjacent the lower and outer portion of the rotary screen and adjacent the upper and interior portion of the screen, said inlets being located at sides of said housing in the direction of travel of said rotary screen thereby providing auxiliary blasts of air for preventing seed from being discharged exteriorly of the housing by rotation of said rotary screen.

4. The seed cleaner of claim 3 including a pair of rollers disposed exteriorly of and closely adjacent to the housing, one each of said rollers engaging the lower outer portion and the inner upper portion of the rotary screen on the side of the housing in the direction of travel of the rotary screen, each of said rollers being provided with a resilient surface whereby trash as it is discharged from the housing by said rotary screen is engaged by said rollers thereby preventing said trash from materially changing position of its major or longitudinal axes as it leaves the chamber and thereby preventing the filtered trash from being drawn through the screen.

5. A seed cleaner comprising a housing having generally upright and downwardly-extending portions, an inlet adjacent the lower end of upright portion of the housing for permitting inflow of air into the housing, an outlet adjacent the downwardly-extending portion of the housing, means for drawing air through the inlet, housing and out the outlet, means for injecting seed into the upright portion of the housing adjacent the lower end and above the inlet, a first rotary screen disposed in the upright portion of the housing and spaced above said inlet a distance sufficient to permit major axes of trash injected with the seed to be aligned at approximately right angles to the direction of flow of said air in the housing, said first rotary screen having openings in its sides thereof to permit passage therethrough of said seeds but insufficient to permit passage of trash having a major or longitudinal axes larger than that of said seed, said first rotary screen extending completely across the housing and being rotatable about a horizontal axis, said housing extending interiorly of and beyond said first rotary screen whereby seed is drawn through the rotary screen and trash presents its longitudinal or major axes to the screen and thereby is filtered from the seed, rotation of the first rotary screen discharging the trash exteriorly of the housing, a second rotary screen rotatable about a horizontal axis spaced upstream from said first rotary screen and extending completely across the downwardly-extending portion of the housing, said second rotary screen having openings in its sides of a size smaller than that of said seed whereby trash is drawn into said second rotary screen and seed is discharged from the housing by rotation of said second rotary screen, means to discharge said trash from the second rotary screen, and means for rotating said first and second rotary screens.

6. The seed cleaner of claim 5 where the housing extends interiorly of the second rotary screen and has its sides there expanded thereby forming a drop out box and includes an outlet for air drawn therethrough which reverses the direction of flow of air in the housing whereby trash in the housing is dropped out of the stream of air, and which includes means for discharging the dropped out trash from the drop out box.

7. In a seed cleaner of the type including a housing, an inlet adjacent one end of the housing for permitting inflow of air into the housing, an outlet adjacent the other end of the housing, means for drawing air through the inlet, housing and out the outlet, and means for feeding seed into the housing adjacent but upstream from the inlet, the improvement of a rotary screen spaced upstream from said inlet, said rotary screen extending completely across the housing and being rotatable about an axis at right angles to the direction of flow of air in the housing, and a drop out box constituting an extension of the housing and disposed at least beyond a side of said rotary screen, said drop out box having its sides extended with respect to those of said housing and communicating with said outlet, the outlet being arranged to provide substantially complete reversal of flow adjacent the inner end of the drop out box, and means for expelling material dropped out in said drop out box from the latter.

8. A seed cleaner comprising a generally upright housing, an inlet adjacent the lower end of the housing for permitting inflow of air into the housing, an outlet adjacent the other end of the housing for permitting outflow of air from the housing, means for drawing air through the inlet, housing and out the outlet, means for feeding seed in the housing adjacent the lower end and above the inlet, a rotary screen spaced above said inlet a distance sufficient to permit major axes of trash included with the seed to be aligned at approximately right angles to the direction of flow of said air in the housing, said rotary screen having openings in its sides sufficient to permit passage therethrough of the seed but insufficient to permit passage therethrough of the trash having longitudinal or major axes larger than that of said seed, said rotary screen extending completely across the housing and being rotatable about a horizontal axis whereby seed is drawn through the rotary screen and trash presents its longitudinal or major axes to the screen and thereby is prevented from being drawn through the screen, rotation of said screen discharging the trash exteriorly of the housing, means for rotating the rotary screen, auxiliary openings at sides of said housing adjacent the underside of the screen and the interior upper side of the screen at the sides of the housing in the direction of rotation of the screen whereby additional air is drawn into the housing at said additional openings thereby preventing seed from being carried out of the housing with the filtered trash, rollers disposed exteriorly of the housing and closely adjacent sides of the housing in the direction of rotation of said screen, and engaging the underside of the screen and the upper inner side of the screen, and trash discharge means proximate each said roller for discharging trash contacted by said rollers.

9. A seed cleaner comprising a housing having a generally upright portion, an inlet adjacent the lower end of the housing for permitting inflow of air into the housing, an outlet adjacent the other end of the housing, means for drawing air through the inlet, housing and out the outlet, means for injecting seed into the housing adjacent the lower end and above the inlet, said means comprising a hopper adapted to feed a thin sheet of seed downwardly into the housing whereby air moving upwardly in the housing contacts the downwardly moving sheet of seed thereby separating the seed, one from another, a rotary screen in the upright portion and spaced above said means for injecting seed a distance sufficient to permit major axes of trash injected with the seed to be aligned at approximately right angles to the direction of flow of said air in the housing upon striking the rotary screen, said rotary screen having openings in its sides sufficient to permit passage therethrough of the seed but insufficient to permit passage therethrough of the longitudinal or major axes of the trash having longitudinal or major axes larger than that of said seed, said rotary screen extending completely across the housing and being rotatable about a horizontal axis whereby seed is drawn into the rotary screen and said trash injected therewith presents its longitudinal or major axes to the screen and thereby is prevented from being drawn through the screen, rotation of said screen discharging the trash exteriorly of the housing, and means for rotating the screen.

10. A seed cleaner comprising a generally inverted U-shaped housing provided with an inlet adjacent one of its lower ends and an outlet adjacent the other of its lower ends for admitting and expelling air from the housing, means in fluid communication with the outlet for drawing air through the inlet, housing and out the outlet, means for injecting seed in the housing disposed above and adjacent the lower inlet end of the housing, a first rotary screen spaced above said inlet a distance sufficient to permit major axes of trash injected with the seed to be aligned at approximately right angle to the direction of flow of said air in the housing, said rotary screen extending completely across the housing and being rotatable about a horizontal axis, said housing continuing interiorly of the rotary screen and in fluid communication with the housing there beyond, a second rotary screen disposed at the lower outlet end of the housing and extending completely across the housing and being rotatable about a horizontal axis, the first rotary screen having openings therein of a size sufficient to permit passage of seed therethrough and the second rotary screen having openings therein of a size which prevents passage of said seed therethrough, conveyer means for discharging the seed from the second rotary screen, a vacuum drop out box in the second rotary screen communicating with said outlet, means for discharging trash from said first rotary screen and said drop out box, and means for rotating said first and second rotary screens.

11. The seed cleaner of claim 10 including means in the housing downstream from the first rotary screen and upstream from the second rotary screen producing eddy currents in the air for upending the trash before passage through the second rotary screen.

12. A method of cleaning seed comprising injecting the seed in a stream of air, propelling the seed by the stream until such time as the longitudinal or major axes of trash injected with the seed align themselves at approximately right angles to the direction of flow of the air, propelling the stream of air through a screen disposed generally at right angles to the direction of flow of the stream of air, said screen having openings of a size sufficient to permit passage therethrough of said seed but insufficient to permit passage therethrough of coarse trash having a longitudinal or major axes greater than that of said seed thereby filtering the seed from the trash, and then propelling the stream of air through a second screen having openings of a size insufficient to permit passage of the seed therethrough but sufficient to permit passage therethrough of trash having longitudinal or major axes smaller than that of said seed, and effecting eddy currents in said stream of air after passage through said first screen but before passage through said second screen whereby injected trash having a larger longitudinal or major axes than that of the seed is positioned out of such alignment at right angles to the direction of flow of the stream of air thereby passing through said second screen.

13. A seed cleaner comprising a housing having a generally upright portion, an inlet adjacent the lower end of the housing for permitting flow of air into the housing, an outlet adjacent the other end of the housing for permitting flow of air out of the housing, means for drawing air through the inlet, housing and out the outlet, feed means for injecting seed into the housing adjacent the lower end and above the inlet, separated feed means, partition means in the housing extending longitudinally of the housing thereby dividing the housing into two or more longitudinally-extending compartments, each said compartment being connected to a feed means, a rotary screen disposed in the upright portion and spaced above said feed means a distance sufficient to permit major axes of trash injected with the seed to be aligned at approximately right angles to the direction of flow of said air in the housing upon striking the rotary screen, said rotary screen having openings in its sides in one compartment relatively fine with respect to openings disposed in its sides in the other compartment, said rotary screen extending completely across the housing and being rotatable about a horizontal axis, and means for rotating said rotary screen.

14. In the separation of particulate material from extraneous objects having minor axes no greater than the major or longitudinal axes of the material and having major or longitudinal axes greater than the major or longitudinal axes of the material, said material and objects being capable of being carried by a stream of gas, the method comprising injecting the particulate material and extraneous objects into a stream of gas, propelling the material and objects by the stream of gas until such time as the longitudinal or major axes of the objects included with the material align themselves at approximately right angles to the direction of flow of the gas, and then propelling the stream of gas through a screen disposed generally at right angles to the direction of flow of the stream of gas, said screen having openings therein of a size sufficient to permit passage therethrough of said material but insufficient to permit passage therethrough of the longitudinal or major axes of said objects whereby the material passes through the screen and the objects impinge and are prevented from passing through the screen.

15. The method of claim 14 in which the stream of gas moves vertically prior to striking the screen.

16. In the separation of seed from trash having minor axes no greater than the major or longitudinal axes of the seed and having major or longitudinal axes greater than the major or longitudinal axes of the seed, the method comprising drawing a stream of air through a housing, injecting seed with its trash into the stream of air and carrying the seed and trash by such stream of air until such time as the longitudinal or major axes of trash align themselves at approximately right angles to the direction of flow of the air, and drawing the stream of air through a screen disposed across the housing, said screen having openings therein of a size sufficient to permit passage therethrough of the seed but insufficient to permit passage therethrough of the longitudinal or major axes of the trash whereby the seed passes through the screen and the trash impinges and is prevented from passing through the screen.

17. The method of separation of linty seed from trash having minor axes no greater than the major or longitudinal axes of the linty seed and having major or longitudinal axes greater than the major or longitudinal axes of the linty seed, comprising drawing a stream of air through a casing, injecting the linty seed with its trash into the stream of air in a thin sheet and in a direction generally opposite to that of said stream of air, propelling the linty seed and its trash by a stream of air until such time as the longitudinal or major axes of the trash align themselves at approximately right angles to the direction of flow of air, and propelling the stream of air across a screen disposed across a housing and generally at right angles to the direction of flow of the stream of air, said screen having openings therein of a size sufficient to permit passage therethrough of said seed but insufficient to permit passage therethrough of the longitudinal or major axes of the trash whereby the seed is drawn through the screen by the stream of air and the trash is prevented from passing therethrough.

References Cited in the file of this patent
UNITED STATES PATENTS

| | | |
|---|---|---|
| 989,233 | Cornwall | Apr. 11, 1911 |
| 2,140,827 | Boag | Dec. 20, 1938 |